US011509537B2

(12) United States Patent
Turner et al.

(10) Patent No.: US 11,509,537 B2
(45) Date of Patent: *Nov. 22, 2022

(54) INTERNET OF THINGS DEVICE DISCOVERY AND DEPLOYMENT

(71) Applicant: VMware, Inc., Palo Alto, CA (US)

(72) Inventors: Stephen Turner, Atlanta, GA (US); Daniel E. Zeck, Roswell, GA (US); Simon Brooks, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/140,593

(22) Filed: Jan. 4, 2021

(65) Prior Publication Data
US 2021/0126835 A1 Apr. 29, 2021

Related U.S. Application Data

(63) Continuation of application No. 16/190,524, filed on Nov. 14, 2018, now Pat. No. 10,887,180.

(51) Int. Cl.
*H04L 41/12* (2022.01)
*H04L 9/40* (2022.01)
*H04L 67/12* (2022.01)
*G06F 3/0484* (2022.01)
*G06F 3/0482* (2013.01)

(52) U.S. Cl.
CPC ........... *H04L 41/12* (2013.01); *H04L 63/083* (2013.01); *H04L 63/0823* (2013.01); *H04L 67/12* (2013.01); *G06F 3/0482* (2013.01); *G06F 3/0484* (2013.01)

(58) Field of Classification Search
CPC ... H04L 41/12; H04L 63/0823; H04L 63/083; H04L 63/0876; H04L 67/12; H04L 41/22; G06F 3/0482; G06F 3/0484; H04W 4/70
See application file for complete search history.

(56) References Cited

U.S. PATENT DOCUMENTS

| 7,856,486 B2 * | 12/2010 | Robertson .............. G06Q 40/00 709/220 |
| 9,094,407 B1 | 7/2015 | Matthieu et al. |
| 10,146,723 B2 * | 12/2018 | Burtch ................ G06F 13/4221 |
| 10,498,598 B1 | 12/2019 | Sanchez et al. |
| 10,511,592 B1 | 12/2019 | Phruksawan et al. |

(Continued)

OTHER PUBLICATIONS

Dejan et al., "Unified IoT Platform Architecture Platforms as Major IoT Building Blocks", Aug. 1, 2018, 2018 International Conference on Computing and Network Communications (CoCoNet) (pp. 6-13) (Year: 2018).*

*Primary Examiner* — Davoud A Zand
(74) *Attorney, Agent, or Firm* — Thomas | Horstemeyer LLP

(57) ABSTRACT

Disclosed are various examples for Internet of Things (IoT) device discovery and deployment. In some embodiments, a device identifier is received from an IoT device. The IoT device is determined, based on the device identifier, to be associated with a device account with a management service. An enrollment of the IoT device is performed. A capabilities declaration is received from the IoT device. IoT device instructions are determined based on the capabilities declaration. IoT device instructions are transmitted to the IoT device, causing it to perform a capability specified in the capabilities declaration.

20 Claims, 5 Drawing Sheets

(56) References Cited

U.S. PATENT DOCUMENTS

| | | | |
|---|---|---|---|
| 2013/0091452 A1* | 4/2013 | Sorden | G06T 17/05 715/771 |
| 2014/0189808 A1 | 7/2014 | Mahaffey et al. | |
| 2016/0134488 A1* | 5/2016 | Straub | H04L 63/06 726/4 |
| 2016/0149917 A1 | 5/2016 | Matthieu et al. | |
| 2017/0140374 A1 | 5/2017 | O'Brien et al. | |
| 2018/0034913 A1 | 2/2018 | Matthieu et al. | |
| 2018/0190264 A1* | 7/2018 | Mixter | G10L 15/22 |

* cited by examiner

INTERNET OF THINGS DEVICE DISCOVERY AND DEPLOYMENT

CROSS-REFERENCE TO RELATED APPLICATIONS

This application is a continuation of and claims the benefit of U.S. patent application Ser. No. 16/190,524, entitled "INTERNET OF THINGS DEVICE DISCOVERY AND DEPLOYMENT," and filed Nov. 14, 2018, which is hereby incorporated by reference in its entirety.

BACKGROUND

Appliances, vehicles, sensors, controllers, actuators, and other devices can gather data and interact with the physical world. This network of devices or Internet-of-Things (IoT) can be utilized to improve operations and provide new services. In order to ensure the security and reliability of IoT device connections in an enterprise setting, the enterprise can utilize a management service capable of protecting IoT device data, as well as email, corporate documents, and other enterprise data from theft, data loss, and unauthorized access. In order to access a network, IoT devices can connect through a gateway or another edge device.

Client devices, edge devices, IoT devices, and other devices can be required to authenticate with the management service or the gateway in order to ensure secure management communications. However, onboarding IoT devices can be costly in time and effort in an enterprise environment that includes multiple IoT devices. Different IoT devices can have different hardware configurations, operating systems, and software configurations. In addition, general authentication can require a user name or user account, which may not be applicable to IoT devices. Manually onboarding these disparate devices can cause delays and lost efficiency in the onboarding process.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to Internet-of-Things (IoT) device onboarding with a management service. The IoT device, when onboarded, can be managed by the management service. In order to provide data and interact with the physical world, IoT devices can connect to a network through a gateway or another edge device. Manual onboarding IoT device or other devices through which IoT devices communicate can be complex, slow, and cause inefficiency in an enterprise environment. However, the present disclosure describes systems and methods that can improve the efficiency of IoT device onboarding.

In some embodiments, a management service can receive, from an Internet of Things (IoT) device, a request including an IoT device identifier. The request can be a request to activate the IoT device. The management service can determine that the IoT device is associated with a device account with the management service. An enrollment of the IoT device with the management service can be performed. A capabilities declaration can be received. The capabilities declaration can include a capability of the IoT device. Multiple capabilities can be included. IoT device instructions can be determined or generated based on the capabilities declaration. The IoT device instructions can be transmitted to the IoT device. This can cause the IoT device to perform the capability.

The management service can transmit enrollment instructions to the IoT device. The enrollment instructions can include an enrollment token. The enrollment instructions can be transmitted based on the IoT device checking in with the management service or an activation request to activate the IoT device. The request that includes the IoT device identifier can be the activation request. In other examples, the request received from the IoT device can be an enrollment request to enroll the IoT device with the management service. The enrollment request can include the enrollment token and the IoT device identifier.

The management service can generate a new device type based on the capabilities declaration. A device registry can be updated to include the new device type. In other examples, an existing device type can be updated to include the capability. The management service can transmit, to the IoT device, instructions to obtain a certificate. The instructions can instruct the IoT device to transmit a Certificate Signing Request (CSR) to a certificate endpoint of the management service. The management service can generate a graphical user interface that provides, to a client device, a command line interface of the IoT device.

Figure 1:
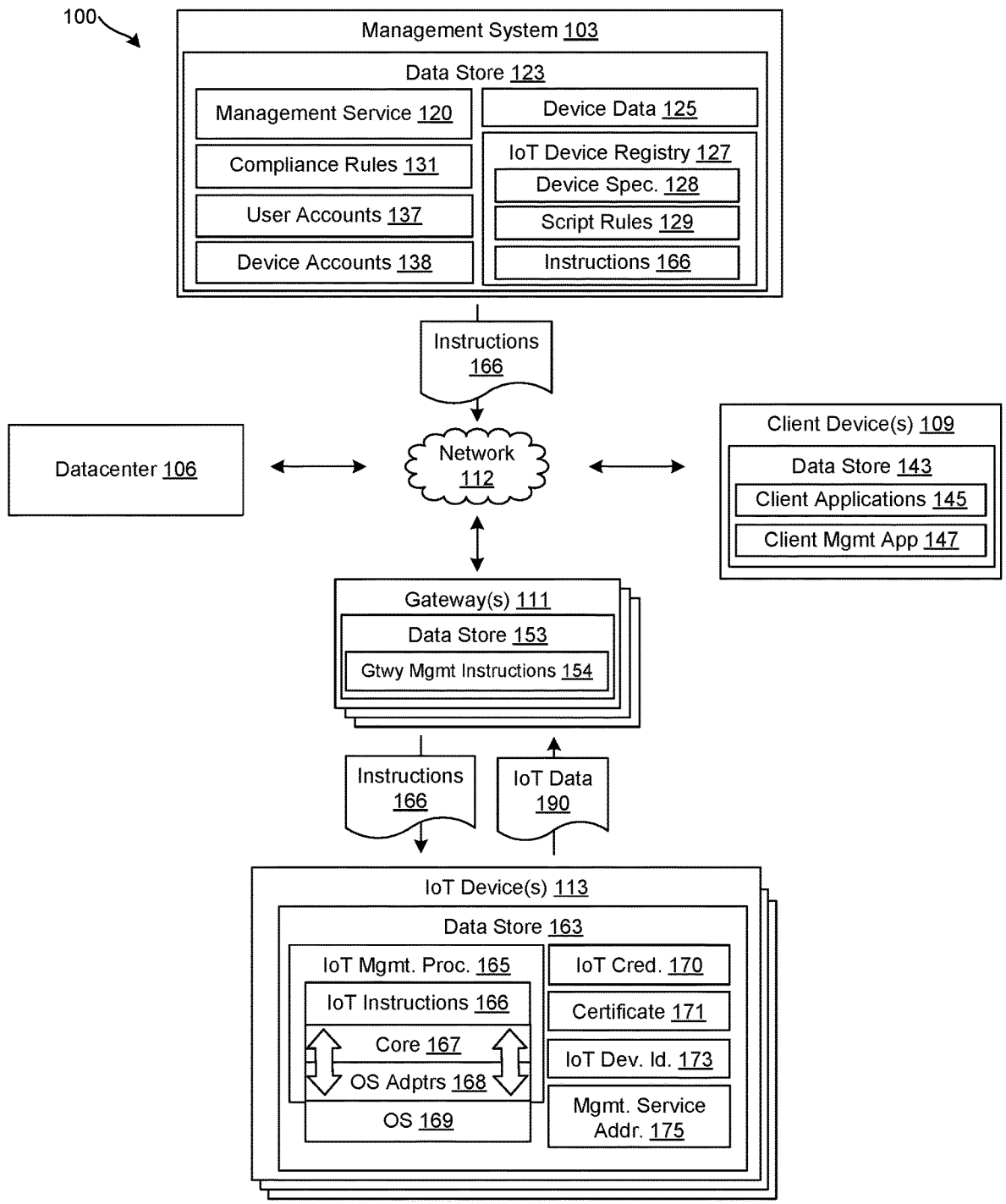
FIG. 1 is a drawing of an example of a networked environment that includes elements involved in onboarding a gateway.

With reference to FIG. 1, shown is an example of a networked environment 100. The networked environment 100 can include a management system 103, a datacenter 106, a client device 109, a gateway 111, Internet-of-Things (IoT) devices 113, and other components in communication with one another over a network 112. In some cases, IoT devices 113 and other devices can connect to the network 112 through the gateway 111. The components of the networked environment 100 can be utilized to onboard IoT devices 113 with the management service 120. This can include and securely transferring IoT device credentials 170, a certificate 171, and other information to the IoT device 113 that allows communication and authentication with the management service 120. The onboarding process can also include transferring IoT management process 165, which can implement instructions and commands on the IoT device 113.

The network 112 can include the Internet, intranets, extranets, wide area networks (WANs), local area networks (LANs), wired networks, wireless networks, other suitable networks, or any combination of two or more such networks. The networks can include satellite networks, cable networks, Ethernet networks, telephony networks, and other types of networks.

The management system 103 can include a server computer or any other system providing computing capability. While referred to in the singular, the management system 103 can include a plurality of computing devices that are arranged in one or more server banks, computer banks, or other arrangements. The management system 103 can include a grid computing resource or any other distributed computing arrangement. The management system 103 can be customer or enterprise-specific. In some embodiments, the management system can be part of a local network, and can be local to at least one of the other components of the networked environment, for example, as shown in FIG. 1. In other embodiments, the management system 103 can be remote from the other components, or the computing devices of the management system 103 can be located in a single installation or can be distributed among many different geographical locations local and/or remote from the other components. The management system 103 can also include or be operated as one or more virtualized computer instances. For purposes of convenience, the management system 103 is referred to herein in the singular. Even though the management system 103 is referred to in the singular, it is understood that a plurality of management systems 103 can be employed in the various arrangements as described above.

The components executed on the management system 103 can include a management service 120, as well as other applications, services, processes, systems, engines, or functionality not discussed in detail herein. The management service 120 can be stored in the data store 123 of the management system 103. While referred to generally as the management service 120 herein, the various functionalities and operations discussed can be provided by the management service 120 or any of its components.

The data store 123 can include any storage device or medium that can contain, store, or maintain the instructions, logic, or applications described herein for use by or in connection with the instruction execution system. The data store 123 can be a hard drive or disk of a host, server computer, or any other system providing storage capability. While referred to in the singular, the data store 123 can include a plurality of storage devices that are arranged in one or more hosts, server banks, computer banks, or other arrangements. The data store 123 can include any one of many physical media, such as magnetic, optical, or semiconductor media. More specific examples include solid-state drives or flash memory. The data store 123 can include memory of the management system 103, mass storage resources of the management system 103, or any other storage resources on which data can be stored by the management system 103. The data stored in the data store 123 can include, for example, management data including device data 125, enterprise data, an IoT device registry 127, compliance rules 131, user accounts 137, and device accounts 138, as well as other data.

Device data 125 can identify client devices 109, gateways 111, and IoT devices 113 by one or more of a device identifier, a unique device identifier (UDID), a media access control (MAC) address, an internet protocol (IP) address, or another identifier that uniquely identifies a device with respect to other devices. The device identifier of an IoT device 113 can include the IoT device identifier 173. The device data 125 can include an enrollment status indicating whether each client device 109, gateway 111, or IoT device 113 is enrolled with or managed by the management service 120. A client device 109, gateway 111, or IoT device 113 designated as "enrolled" can be permitted to access the enterprise data, while a client device 109, gateway 111, or IoT device 113 designated as "not enrolled," or having no designation, can be denied access to the enterprise data.

The device data 125 can include indications of the state of devices including the client devices 109, gateways 111, and IoT devices 113. For instance, these indications can specify applications that are installed on the client devices 109, gateways 111, and IoT devices 113, configurations or settings that are applied to each of the devices, user accounts 137, device accounts 138, or service accounts associated with each of the devices, the physical locations of each of the devices, the network to which each of the devices is connected, and other information describing the current state of each of the devices. While a user account 137 can be associated with a particular person, in some cases a user account 137 can be unassociated with any particular person, and can nevertheless be utilized for client devices 109, gateways 111, or IoT devices 113 that provide certain functionalities, such as automatic functionalities. For example, IoT device 113 can be associated with a service account or a device account 138 that is user unassociated, or not associated with any person.

Device data 125 can also include data pertaining to user groups. An administrator can specify one or more of the client devices 109, gateways 111, and IoT devices 113 as belonging to a user group. The user group can refer to a group of user accounts 137, which can include device accounts 138. User groups can be created by an administrator of the management service 120 such that a batch of client devices 109, gateways 111, and/or IoT devices 113 can be configured according to common settings. For instance, an enterprise can create a user group for the marketing department and the sales department, where client devices 109, gateways 111, and/or IoT devices 113 in the marketing department are configured differently from the client devices 109, gateways 111, and/or IoT devices 113 in the sales department.

The IoT device registry 127 can include, for each IoT device 113, device specifications 128, script rules 129, and instructions 166. The device specifications 128 can be declared by the IoT device 113 by transmitting, to the management service 120, a capabilities declaration or specification declaration including device capabilities and other device specifications 128. Device specifications 128 can include a type or category of the IoT device 113, an IoT device identifier 173, and a list of device-supported capabilities. The manufacturer can expose the device-supported capabilities. IoT management process 165 can include a core 167 and OS adapters 168 that enable communication with OS 169 APIs to implement the commands. Specifications for the IoT device 113 can include hardware configurations including a chipset utilized by the device, a performance or capacity, a model identifier, and software configurations, including applications installed on the IoT device 113. Specifications of the IoT device 113 can also include an operating system 169 and a version of the operating system 169.

The script rules 129 can include rules and documentation for scripting or otherwise coding instructions 166 for each device-supported capability. The instructions 166 can include scripts or other code that cause an IoT device 113 to perform actions, commands, or capabilities. The instructions 166 can also include a driver to support commands or capabilities declared by the IoT device 113. The IoT device registry 127 can also include an organizational group for the IoT device 113. The management service 120 can associate, within the IoT device registry 127, the organizational group with a particular device type of the IoT device 113 or a particular IoT device identifier 173 of the IoT device 113.

The IoT device registry 127 can be organized according to device type or category. The management service 120 can, upon check-in of an IoT device 113, identify whether the IoT device 113 belongs to an existing device type, or whether a new device type should be created. The IoT device 113 can then be provisioned. In some cases, the management service 120 can identify the device type based on a declared device type received from the IoT device 113. The management service 120 can alternatively identify the device type based on comparing other specifications or device specifications 128 declared by the IoT device 113 to those within the IoT device registry 127.

Compliance rules 131 can include, for example, configurable criteria that must be satisfied for an enrolled one of the client devices 109, gateways 111, and IoT devices 113 to be in compliance with the management service 120. The compliance rules 131 can be based on a number of factors, including geographical location, activation status, enrollment status, and authentication data including authentication data obtained by a device registration system, time, and date, and network properties, among other factors associated with each device. The compliance rules can also be determined based on a user account 137 associated with a user. In some cases, a gateway 111 can be unassociated with a user, but can nevertheless be associated with a service account, a device account 138, or another user account 137 that is unassociated with a user.

Compliance rules 131 can include predefined constraints that must be met in order for the management service 120, or other applications, to permit access to the enterprise data or features of the gateway 111. The management service 120 can communicate with gateway management instructions 154, to determine whether states exist on the gateway 111 that do not satisfy one or more compliance rules 131. States can include, for example, a virus or malware being detected on the device; installation or execution of a blacklisted application; and/or a device being "rooted" or "jailbroken," where root access is provided to a user of the device. Additional states can include the presence of particular files, questionable device configurations, vulnerable versions of applications, vulnerable states of IoT devices 113 or other vulnerability, as can be appreciated.

The management service 120 can communicate with the gateway to determine whether states exist that do not satisfy one or more compliance rules 131 regarding the gateway 111 and IoT devices 113. The IoT device 113 can transmit IoT data 190, such as sensor data or status data to an upstream target, such as an endpoint of the management service 120 or the datacenter 106. The endpoint can be an IP address, a URL, or other network address identifier. In some cases, the gateway 111 can receive IoT device 113 communications. The gateway 111 can pass or otherwise transmit the IoT data 190 to the management service 120. IoT device 113 can also transmit status data to the management service 120 for evaluation of compliance rules. In some cases, the management service 120 can transmit all or a portion of the compliance rules 131 to the gateway 111. The gateway 111 can determine or evaluate whether states exist, for example on the IoT devices 113, that do not satisfy one or more compliance rules 131, for example, without passing or transmitting the status data to the management service 120. In any case, determining that states exist in the IoT device 113 that do not satisfy one or more compliance rules 131 can trigger transmission of an action or command that causes the IoT device 113 to be in compliance with the compliance rules 131.

The management service 120 can oversee the management of devices including the client devices 109, gateways 111, and IoT devices 113. The management service 120 can oversee the operation of the devices enrolled with the management service 120 as well as enrollment and un-enrollment operations for the devices, for example, using the management service 120. The management service 120 can provide functionality using application program interfaces (APIs). To this end, an API of the management service 120 can provide enrollment information regarding a device, such as whether the device is enrolled with the management service 120. APIs or API calls can be provided for other functionalities of the management service 120 as discussed herein.

The management service 120 can transmit various instructions 166 to the IoT device 113, which are then installed, configured, or implemented by the IoT management process 165. The instructions 166 can include commands or actions for the IoT device 113. The scripts can be performed by translation or implementation of the scripts by the IoT management process 165. The IoT management process 165 can include OS adapters 168 that access OS 169 APIs of the particular IoT device 113. In this way, the IoT management process 165 allows scripts to be performed on specific IoT devices 113.

The management service 120 can further cause policies to be implemented on an IoT device 113. Policies can include, for example, restrictions or permissions pertaining to capabilities or functionalities of the IoT device 113. For instance, policies can require certain hardware or software functions of the IoT device 113 to be enabled or be disabled during a certain time period or based on a particular location. Policies can require IoT data 190 to be transmitted by the IoT device 113 to be proxied through a particular endpoint of the management service 120. Policies can be implemented by the IoT management process 165. In some cases, the installation or implementation of an enrollment policy can complete an enrollment of the IoT device 113 with the management service 120.

Likewise, the management service 120 can transmit various software components to the client device 109 which are then installed, configured, or implemented by the client management application 147. Such software components can include, for example, additional applications 145, resources, libraries, drivers, device configurations, or other similar components that require installation on the client device 109 as specified by an administrator of the management service 120. The management service 120 can further cause policies to be implemented on a client device 109. Policies can include, for example, restrictions or permissions pertaining to capabilities of a client device 109. For instance, policies can require certain hardware or software functions of the client device 109 to be enabled or be disabled during a certain time period or when the client device 109 is physically located at a particular location. Such policies can be implemented by client management application 147.

The management service 120 can also transmit various software components to the IoT device 113 which are then installed, configured, or implemented by the IoT management process 165. Such software components can include, for example, applications, resources, libraries, drivers, device configurations, or other similar components that require installation on the IoT device 113 as specified by an administrator of the management service 120. The management service 120 can further cause policies to be implemented on the IoT device 113. Policies can include, for example, restrictions or permissions pertaining to capabilities of an IoT device 113. For instance, policies can require certain hardware or software functions of the IoT device 113 to be enabled or be disabled during a certain time period or when the IoT device 113 is physically located at a particular location. Such policies can be implemented by the IoT management process 165. The management service 120 can transmit the software components to the IoT device 113 through the gateway 111. The management service 120 can have a command queue storing at least one action to perform on the particular gateway 111 upon check-in of the gateway 111. For instance, the gateway management instructions 154 can cause the gateway 111 to check-in with the management service 120, identify an action in the command queue, and perform or implement the action. An action can be the installation of a profile, or the execution of a command or other actions to install software components, implement policies, update the gateway management instructions 154, install a software product, or implement other commands. In some cases, the gateway management instructions 154 can cause a check-in of the gateway 111 periodically, on a schedule, or upon an event, such as changing a state of the gateway 111, installing an application on the gateway 111, upon detecting an IoT device 113, or upon receiving a request to access the network 112 or another request from an IoT device 113. In one example, the contents of the command queue can include a command that the gateway management instructions 154 cause to be executed on the gateway 111. In another example, the contents of the command queue can include a resource, an application, or an application update that the gateway management instructions 154 cause to be installed on the gateway 111, which the gateway can access through a specified uniform resource locator (URL) in the command. A client device 109 can likewise be associated with a command queue and can retrieve and implement commands.

The management service 120 can also request that the gateway 111 or client device 109 check-in using a notification service like APPLE® Push Notification Service (APNS), GOOGLE® Cloud Messaging (GCM), WINDOWS® Push Notification Services (WNS), or AirWatch® Cloud Messaging (AWCM). For example, the management service 120 can transmit a request to the notification service, which requests that the gateway 111 check-in with the management service 120. The notification service can push or otherwise route a notification to the gateway 111. Once the notification is received, the gateway management instructions 154 can cause the gateway 111 to check-in with the management service 120. The gateway management instructions 154 can determine whether a command queue provided by the management service 120 for the respective gateway 111 contains any commands or resources for the gateway 111, and, if so, can cause the commands or resources to be downloaded and/or implemented on the gateway 111. A client device 109 can likewise be associated with a command queue and can retrieve and implement commands in response to a request from a notification service.

The management service 120 can oversee the enrollment of gateway 111 with the management service 120. In some instances, the management service 120 can include a web application that can be accessed by the client device 109 through the network 112 to perform functionality related to secure enrollment of gateway 111 and secure delivery of credentials to the gateway 111. The management service 120 instructions can also store other functionality in a data store 123 of the management system 103. The data store 123 can include memory of the management system 103, mass storage resources of the management system 103, or any other storage resources on which data can be stored by the management system 103.

The management service 120 can provide operations associated with enrollment of the gateway 111 with the management service 120. For example, the management service 120 can provide an endpoint such as an API, network site, or network location for enrollment of the gateway 111 with the management service 120. The management service 120 can receive a request to enroll the gateway 111 that includes a gateway identifier 156. The request can also include an enterprise identifier that uniquely identifies an enterprise or a customer. The management service 120 can then perform enrollment operations. In the various examples, the enrollment operations can include one or more of creating a device account 138 associated with the IoT device 113, generating IoT credentials 170 for authentication of the IoT device 113 with the management service 120, associating the IoT credentials 170 with an account 138, setting or changing ACL rules associated with the device account 138, and securely transmitting the IoT credentials 170 to the IoT device 113.

The IoT data 190 can include a stream of at least one tuple including a number and a time stamp. The IoT data 190 can include a sampling function which is a user defined method (udm), a sampling frequency stating the interval between subsequent executions of the udm, and an aggregation count stating how many executions of the udm to aggregate before sending the IoT data 190 to the management service 120. The IoT data 190 can include SI units and a prefix that identifies what the numbers of the stream of IoT data 190 represent. A user interface can be generated based at least in part on the IoT data 190.

The client device 109 can be representative of one or more client devices 109. The client device 109 can include a processor-based system, such as a computer system, that can include a desktop computer, a laptop computer, a personal digital assistant, a cellular telephone, a smartphone, a set-top step, a music player, a tablet computer system, a game console, an electronic book reader, a smartwatch, or any other device with like capability. The client device 109 can have an operating system that can perform functionalities and execute applications. The operating system can be stored in a data store 143 that also includes applications 145, a client management application 147, and other data. The client device 109 can execute the client management application 147 to perform or access the functionality described for the management service 120.

The client device 109 can also be equipped with networking capability or networking interfaces, including a localized networking or communication capability, such as a near-field communication (NFC) capability, radio-frequency identification (RFID) read or write capability, or other localized communication capability. In some embodiments, the client device 109 is mobile where the client device 109 is easily portable from one location to another, such as a smart phone, tablet, or laptop computer. In other situations, the client device 109 can be a desktop machine or a kiosk that is not easily portable.

The operating system of the client device 109 can be configured to execute various applications 145, such as a client management application 147, a browser application, or another application. The operating system and some applications 145 can access network content served up by the management system 103, or other servers, thereby rendering a user interface on a display, such as a liquid crystal display (LCD), organic light emitting diode (OLED) display, touch-screen display, or other type of display device.

To this end, some applications 145 can include a browser or a dedicated application, and a user interface can include a network page, an application screen, or other interface. The client device 109 can also access web applications using the browser application. Further, other applications 145 can include device management applications, enterprise applications, social networking applications, word processors, spreadsheet applications, media player applications, or other applications. The client management application 147 can perform actions as directed by the management service 120, for instance, by checking in with the management service 120, retrieving a command from the command queue, and implementing the command as discussed above.

The gateway 111 can be representative of one or more gateways 111. While referred to as a gateway, the gateway 111 can also be representative of routing switches, integrated access devices (IADs), multiplexers, a variety of metropolitan area network (MAN) and wide area network (WAN) access devices, and other edge devices. The gateway 111 can execute gateway management instructions 154 and other applications and modules stored in the data store 153. The gateway management instructions 154 can perform management functionalities including enrollment functionalities, product and application installations, and profile installations. These functionalities can include a number of modules or components that perform actions through the gateway 111, and the gateway management instructions can be updated, upgraded, or otherwise altered throughout the lifecycle of the gateway 111.

The IoT devices 113 can be appliances, vehicles, sensors, controllers, actuators, and other physical devices including at least: a processor, network communication hardware, and a memory including executable instructions for communicating with a gateway 111. The IoT device 113 can be representative of one or more IoT devices 113. The IoT device 113 can include appliances, vehicles, sensors, controllers, actuators, monitors, phones, tablets, thermostats, speakers, screen boards, kiosks, and other devices and can incorporate processor-based systems, such as a computer system or any other device with like capability. The IoT device 113 can, in some examples, include a headless device without a graphical user interface. Such a headless device can have inputs and outputs through other interfaces like network or serial ports. An IoT device 113 can include an ad board, information board, or other screen board that provides a graphical display but generally does not provide for user interaction with the graphical display and rejects access to system functions. In further cases, an IoT device 113 can include a kiosk or interactive graphical user interface that is locked into a defined functionality and rejects access to system functions. The IoT device 113 can have an operating system or other software that can perform functionalities and execute applications. The operating system can be stored in a data store 163. The IoT device 113 can execute the IoT management process 165 to perform or access the functionality described for the management service 120.

The IoT device 113 can also be equipped with networking capability or networking interfaces, including a localized networking or communication capability, such as a near-field communication (NFC) capability, radio-frequency identification (RFID) read or write capability, or other localized communication capability. In some embodiments, the IoT device 113 is mobile where the IoT device 113 is easily portable from one location to another. In other situations, the IoT device 113 can be a thermostat, fixture, or other device that is not easily portable.

The IoT management process 165 can include a core 167 and OS adapters 168 which communicate with an operating system (OS) 169 of the IoT device 113. The instructions 166 can be scripts, applications, processes, or other code received from the management service 120. The instructions 166 can cause an IoT device 113 to perform actions, commands, or otherwise utilize capabilities of the IoT device 113. The instructions 166 can be considered an IoT management process 165 and can be included in the initially installed IoT management process 165. In other cases, only the core 167 and the OS adapters are initially included, and the instructions 166 are received from the management service 120 thereafter.

The core 167 and the OS adapters 168 can be installed to the IoT device 113 by the manufacturer or can otherwise be installed as a bootstrap package to a batch or set of IoT devices 113 associated with a particular customer or enterprise. The core 167 can be device-agnostic and operating-system-agnostic. OS adapters 168 can enable communication with APIs of the OS 169 to implement commands. In some examples the OS adapters 168 can include only those for the particular IoT device 113 and operating system 169. In other cases, a set of OS adapters can be included so that a single IoT management process 165 is executable on multiple different IoT devices 113 and operating systems 169.

The core 167 of the IoT management process 165 can enable hash-based message authentication code (HMAC) communications with any endpoint of the management service 120. The HMAC communications can allow authentication and verification of data integrity for a message, command, or other communication with the management service 120. The core 167 can enable the IoT device 113 to save profiles, configurations, files, and other data to the data store 163. The core 167 can also encrypt the data that is saved to the data store 163.

The core 167 can include enrollment instructions for the IoT device 113. The enrollment instructions can cause the IoT device 113 to transmit, to the management service, a request to enroll the IoT device 113. The request to enroll the IoT device 113 can include an IoT device identifier 173. IoT device identifier 173 can include a unique device identifier (UDID), a media access control (MAC) address, an internet protocol (IP) address, or another identifier that uniquely identifies a device with respect to other devices. The IoT device Identifier 173 can include a manufacturer-assigned serial number or a unique device activation identifier generated by the management service 120. Enrollment instructions can also include a management service address 175. Management service address 175 can include a URL, IP address, or other network address of an endpoint of the management service 120. The communications with the management service 120 can be HMAC authenticated. The enrollment instructions can include credentials 170. The credentials 170 can include enrollment credentials and account credentials. The enrollment credentials can include an enrollment token, HMAC token, value, parameter, or file that can be used to enroll the IoT device 113 with the management service 120. The account credentials can include an HMAC token, value, parameter, or file that can be used to authenticate the IoT device 113 with the management service 120. The account credentials can identify a device account 138 associated with the IoT device 113 in the management service 120.

The core 167 can also enable Simple Certificate Enrollment Protocol (SCEP). Once the IoT device 113 is enrolled, the management service 120 can transmit to the IoT device 113 parameters it needs to generate a key pair and a Certificate Signing Request (CSR). The key pair can be included in a field of the CSR. The IoT management process 165 can submit the CSR to a SCEP endpoint. In some cases, the SCEP endpoint can be an endpoint of the management service 120. The SCEP endpoint can return a signed certificate 171 to the IoT device 113. The IoT management process 165 can manage the certificate 171 and a private key, including transmitting a new CSR to renew or replace the certificate 171. The certificate 171 can be signed by a certificate authority associated with the management service 120. The certificate authority can be provided or self-signed by the management service 120, or can be a third party certificate authority utilized by the management service 120. The certificate 171 can authenticate the IoT device 113 with the management service 120.

The enrollment instructions can be installed as part of a bootstrap package, or can be received from the management service 120 in response to the request to enroll the IoT device 113. The management service address 175 can be an enrollment endpoint, a command queue endpoint, or another endpoint of the management service 120. Enrollment of the IoT device 113 can include verification, by the management service 120, that the enrollment request has been received from the IoT device 113. Enrollment can also include transmission and installation of enrollment policy or other instructions 166 to the IoT device 113.

The core 167 can enable HTTP streaming, including inbound and outbound connections. For example, the IoT management process 165 can listen for an inbound HTTP stream from the management service. The management service 120 can push or transmit commands to the IoT device 113 using HTTP or HTTP-based communications protocol. For example, enrollment instructions can be received through the HTTP commands received from the management service 120. The core 167 of the IoT management process 165 can also include instructions to check-in with the management service 120. The management service 120 can also maintain a command queue for the IoT device 113. The management service 120 can place commands and actions in the command queue for the IoT device 113. The IoT management process 165 can check in with the management service 120, retrieve a command from the command queue, and implement the command. For example, a command to enroll the IoT device 113 can be retrieved from the command queue, the command to enroll can include enrollment instructions as discussed above.

Figure 2:
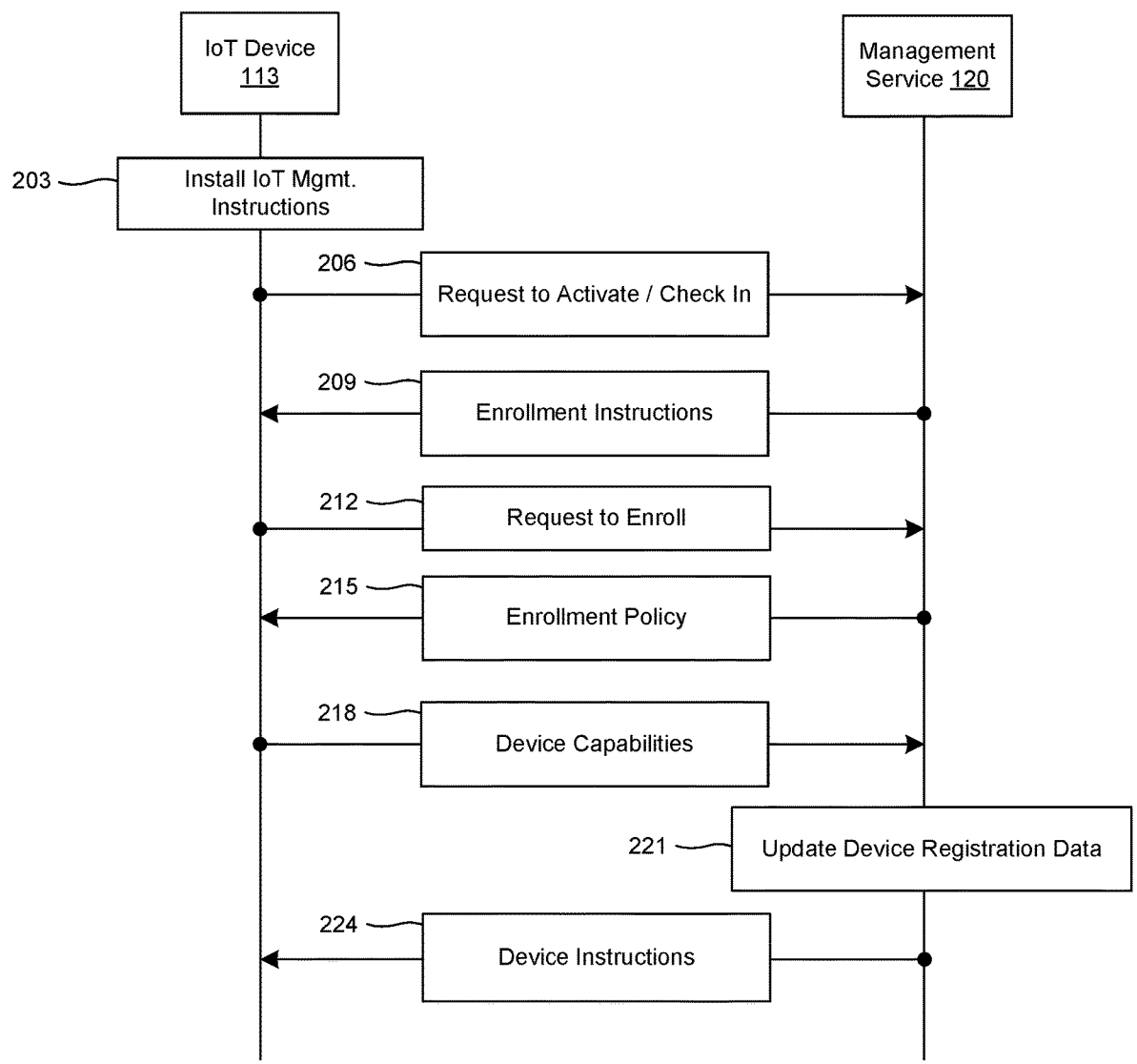
FIG. 2 is a sequence diagram illustrating functionality implemented by components of the networked environment.

FIG. 2 shows a sequence diagram that illustrates steps performed by components of the networked environment 100. Generally, this sequence enables the IoT device 113 to enroll with the management service 120 and receive instructions 166 that can define further actions.

In step 203, IoT management process 165 can be installed to the IoT device 113. For example, a bootstrap package that includes the core 167 and the OS adapters 168 can be installed to the IoT device 113 by the manufacturer or an administrator associated with a particular customer or enterprise. The IoT management process 165 can be installed to a batch or set of IoT devices 113 associated with a particular customer or enterprise. Instructions 166 can be included in the initial IoT management process 165. In other cases, instructions 166 can be transmitted to the IoT management process once the IoT device 113 checks in, transmits an activation request, or transmits an enrollment request. The IoT management process 165 can include instructions to contact the management service 120. For example, the instructions to contact the management service 120 can include an endpoint or other network address associated with the management service 120. The instructions to contact the management service 120 can include instructions to transmit an activation request or check in with the management service 120.

In step 206, the IoT management process 165 can transmit an activation request to the management service 120. The activation request can include an IoT device identifier 173 that uniquely identifies the IoT device 113 with respect to other IoT devices 113. In some cases, the IoT device identifier 173 can be a manufacturer-assigned serial number or identifier. The IoT management process 165 can search the data store 163 for the IoT device identifier 173 or can query an API of the IoT device 113 in order to identify the IoT device identifier 173. The management service 120 can consider an initial check-in of the IoT device 113 to be an activation request.

The management service 120 can determine that the IoT device identifier 173 is associated with a device account 138. An onboarding or deployment list can specify a number of IoT devices 113 that are to be deployed by an enterprise. The IoT devices 113 can be specified according to respective IoT device identifiers 173. The deployment list can be provided to the management service 120. To this end, the management service 120 can provide an endpoint through which data including the deployment list can be received. In other cases, the management service 120 can generate a graphical user interface element or prompt through which an administrator can enter or create the deployment list. The management service 120 can generate a device account 138 for each IoT device 113 in the deployment list. A respective IoT device identifier 173 can be stored in association with a respective IoT device 113.

The management service 120 can also generate respective IoT credentials 170 such as a device account credential for each device account 138. A device account credential can identify a particular device account 138 with respect to other device accounts 138. The device account credential can include a value, parameter, or a file. The IoT credentials 170 can also include one or more of an enrollment token, HMAC token, value, parameter, or a file that can be used to verify authenticity of, or otherwise authenticate, communications between the IoT device 113 and the management service 120.

In step 209, the IoT management process 165 can receive enrollment instructions from the management service 120. The enrollment instructions can be considered IoT instructions 166. The enrollment instructions can specify IoT credentials 170 and an enrollment endpoint of the management service 120. The IoT management process 165 can obscure the IoT credentials 170 such that a user of the IoT device 113 does not have access to the IoT credentials 170. The core 167 of the IoT management process 165 can utilize an encryption algorithm to encrypt the IoT credentials 170 and other data received from the management service 120.

In step 212, the IoT management process 165 can transmit an enrollment request to the management service 120. The enrollment request can include IoT credentials 170. For example, the enrollment request can include the device account name and password. The enrollment request can also include an enrollment token or an HMAC token. IoT management process 165 can transmit the enrollment request to an enrollment endpoint of the management service 120 that is specified in the enrollment instructions.

In step 215, the management service 120 can transmit an enrollment policy from the management service 120. The enrollment policy can include a set of configurations or settings for the IoT device 113. The enrollment policy can be installed or implemented by the IoT management process 165. Enrollment of the IoT device 113 can include transmitting the enrollment policy to the IoT device 113 and installing or implementing the enrollment policy by the IoT management process 165. In some cases, the IoT management process 165 transmits a confirmation that the IoT device 113 is in compliance with the enrollment policy. Where an enrollment policy is not used, enrollment of the IoT device 113 can be considered completed once the enrollment request is received by the management service 120. The management service 120 can store an indication that the IoT device 113 is enrolled.

The enrollment instructions can also include instructions to obtain a certificate 171. Alternatively, once the IoT device 113 is enrolled, the management service 120 can transmit, to the IoT device 113, parameters it needs to generate a key pair and a Certificate Signing Request (CSR). The key pair can be included in a field of the CSR. The IoT management process 165 can submit the CSR to a SCEP endpoint. In some cases, the SCEP endpoint can be an endpoint of the management service 120. The SCEP endpoint can return a signed certificate 171 to the IoT device 113. The IoT management process 165 can manage the certificate 171 and a private key, including transmitting a new CSR to renew or replace the certificate 171. The certificate 171 can be signed by a certificate authority associated with the management service 120. The certificate authority can be provided or self-signed by the management service 120, or the certificate authority can be a third party certificate authority utilized by the management service 120. The certificate 171 can be considered additional IoT credentials 170. Communications with the management service 120 can utilize HMAC authentication and data verification, the certificate 171, and other IoT credentials 170.

In step 218, the IoT management process 165 can transmit device capabilities to the management service 120. For example, the IoT management process 165 can transmit a capabilities declaration to the management service 120. The capabilities declaration can include device specifications 128. Device specifications 128 can include a type or category of the IoT device 113, an IoT device identifier 173, and a list of device-supported capabilities. The manufacturer can expose the device-supported capabilities through the operating system 169. Device specifications 128 for the IoT device 113 can also include a hardware configuration and a software configuration of the IoT device 113. The hardware configuration can specify a chipset utilized by the device, a performance or capacity, and a model identifier. The software configuration can specify applications installed on the IoT device 113, versions of installed applications, the operating system 169, and a version of the operating system 169.

In step 221, the management service 120 can update device registration data within the IoT device registry 127. The management service 120 can determine whether the IoT device 113 is associated with a category of IoT device within the IoT device registry 127. For example, the management service 120 can perform an analysis of the capabilities declaration with respect to the IoT device registry 127. The management service 120 can determine that the IoT device 113 is associated with a particular category of IoT devices 113 based on a device type specified in the capabilities declaration, the capabilities of the IoT device 113, or other device specifications 128. The management service 120 can update the device category within the IoT device registry 127 to include additional capabilities from the capabilities declaration, for example, those that were not previously associated with the device category. If the IoT device 113 is unassociated with the categories currently within the IoT device registry 127, the management service 120 can update the IoT device registry 127 to include a new category. The new category can include the capabilities and other device specifications 128 from the capabilities declaration.

In step 224, the management service 120 can transmit device instructions 166 to the IoT device 113. The instructions 166 can include scripts or other code that cause an IoT device 113 to perform actions, commands, or capabilities. For example, the instructions 166 can cause the IoT device 113 to transmit IoT data 190 to a particular upstream endpoint or network address. The upstream endpoint can include the management service 120 or the datacenter 106. The IoT data 190 can include a stream of at least one tuple, including a number and a time stamp. The IoT device 113 can transmit the IoT data 190 according to a user defined method (udm), a sampling frequency stating the interval between subsequent executions of the udm, and an aggregation count stating how many executions of the udm to aggregate before sending the IoT data 190 to the management service 120. The IoT data 190 can include SI units and a prefix that identifies what the numbers of the stream of IoT data 190 represent. The instructions 166 can also include a driver to support commands or capabilities declared by the IoT device 113. The IoT management process 165 can receive the device instructions 166 and cause the IoT device 113 to carry them out.

Figure 3:
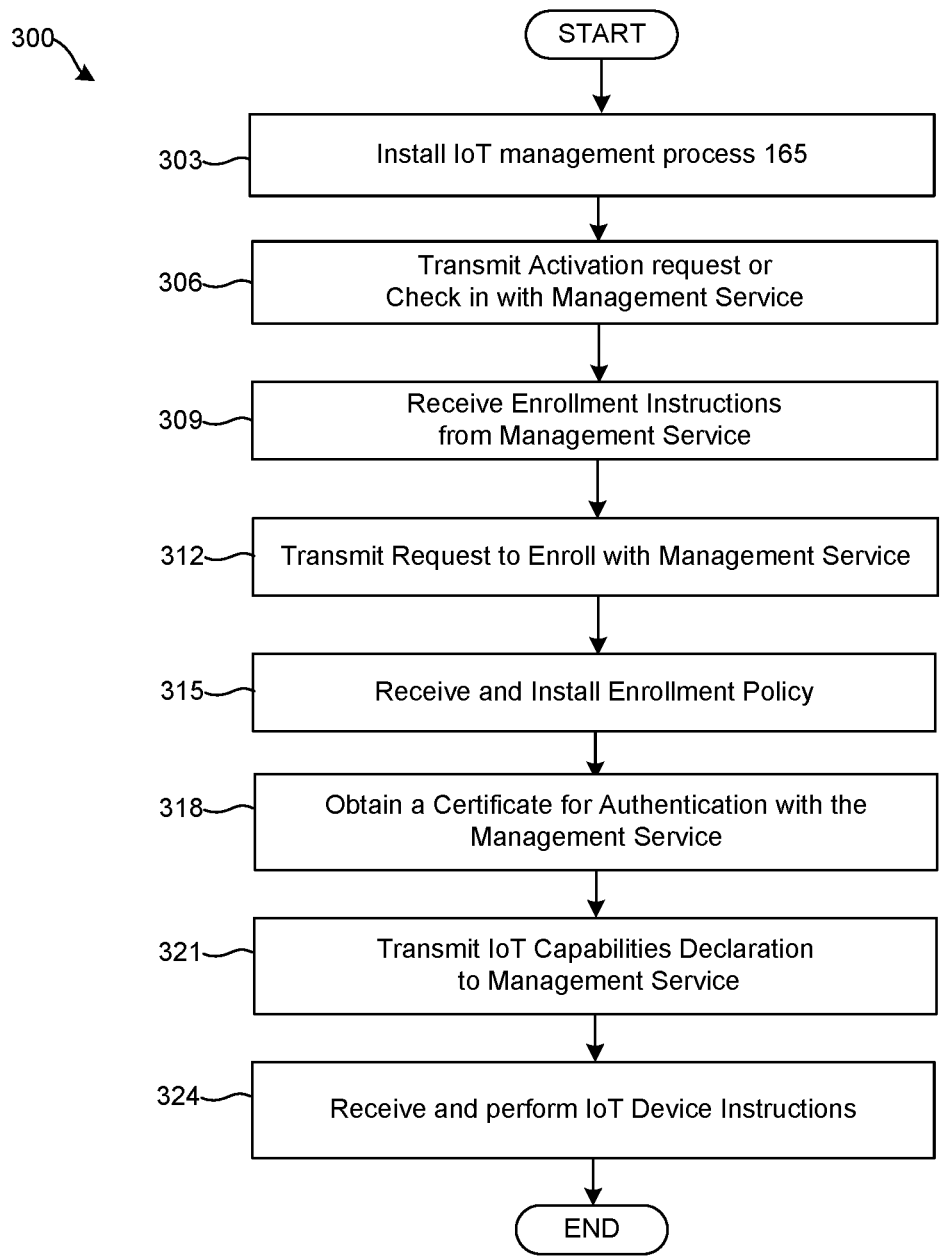
FIGS. 3 and 4 are flowcharts illustrating functionality implemented by components of the networked environment.

FIG. 3 shows a flowchart 300 that illustrates an example of the operation of the IoT device 113. Flowchart 300 illustrates an example of onboarding of the IoT device 113 with the management service 120. Generally, this flowchart enables the IoT device 113 to enroll with the management service 120 and receive instructions 166 that define further actions.

In step 303, IoT management process 165 can be installed to the IoT device 113. For example, a bootstrap package that includes the core 167 and the OS adapters 168 can be installed to the IoT device 113 by the manufacturer or an administrator associated with a particular customer or enterprise. The IoT management process 165 can be installed to a batch or set of IoT devices 113 associated with a particular customer or enterprise. The IoT management process 165 can include instructions to contact the management service 120. For example, the instructions to contact the management service 120 can include an endpoint or other network address associated with the management service 120. The instructions to contact the management service 120 can include instructions to transmit an activation request or check in with the management service 120.

In step 306, the IoT management process 165 can transmit an activation request to the management service 120. The activation request can include an IoT device identifier 173 that uniquely identifies the IoT device 113 with respect to other IoT devices 113. In some cases, the IoT device identifier 173 can be a manufacturer-assigned serial number or identifier. The IoT management process 165 can search the data store 163 for the IoT device identifier 173 or can query an API of the IoT device 113 in order to identify the IoT device identifier 173. The management service 120 can consider an initial check-in of the IoT device 113 to be an activation request.

In step 309, the IoT management process 165 can receive enrollment instructions from the management service 120.

The enrollment instructions can specify IoT credentials 170 and an enrollment endpoint of the management service 120. The IoT management process 165 can obscure the IoT credentials 170 such that a user of the IoT device 113 does not have access to the IoT credentials 170. The core 167 of the IoT management process 165 can utilize an encryption algorithm to encrypt the IoT credentials 170 and other data received from the management service 120.

In step 312, the IoT management process 165 can transmit an enrollment request to the management service 120. The enrollment request can include IoT credentials 170. For example, the enrollment request can include the device account name and password. The enrollment request can also include an enrollment token, or an HMAC token. IoT management process 165 can transmit the enrollment request to an enrollment endpoint of the management service 120 specified in the enrollment instructions.

In step 315, IoT management process 165 can receive and install an enrollment policy from the management service 120. The enrollment policy can include a set of configurations or settings for the IoT device 113. The enrollment policy can be installed or implemented by the IoT management process 165. Enrollment of the IoT device 113 can include transmitting the enrollment policy to the IoT device 113 and installing or implementing the enrollment policy by the IoT management process 165. In some cases, the IoT management process 165 transmits a confirmation that the IoT device 113 is in compliance with the enrollment policy.

In step 318, IoT management process 165 can obtain a certificate 171. Once the IoT device 113 is enrolled, the management service 120 can transmit, to the IoT device 113, parameters and instructions to generate a key pair and a Certificate Signing Request (CSR). The IoT management process 165 can perform the instructions and generate the key pair. The instructions can include a cryptographic algorithm, and the IoT management process can input the parameters to the cryptographic algorithm to generate the key pair. The IoT management process 165 can then generate the CSR and include the key pair within a field of the CSR. The IoT management process 165 can submit the CSR to a SCEP endpoint. In some cases, the SCEP endpoint can be an endpoint of the management service 120. The SCEP endpoint can return a signed certificate 171 to the IoT device 113. Once obtained, the IoT management process 165 can authenticate its communications with the management service 120 based on the certificate 171.

In step 321, the IoT management process 165 can transmit a capabilities declaration to the management service 120. The capabilities declaration can include device specifications 128. Device specifications 128 can include a type or category of the IoT device 113, an IoT device identifier 173, and a list of device-supported capabilities. Device specifications 128 for the IoT device 113 can also include a hardware configuration and a software configuration of the IoT device 113. The hardware configuration can specify a chipset utilized by the device, a performance or capacity, and a model identifier. The software configuration can specify applications installed on the IoT device 113, versions of installed applications, the operating system 169, and a version of the operating system 169.

In step 324, the IoT management process 165 can receive and perform device instructions 166 to the IoT device 113. The instructions 166 can include scripts or other code that cause an IoT device 113 to perform actions, commands, or capabilities. For example, the instructions 166 can cause the IoT device 113 to transmit IoT data 190 to a particular upstream endpoint or network address. The upstream endpoint can include the management service 120 or the datacenter 106. The IoT data 190 can include a stream of at least one tuple including a number and a time stamp. The IoT device 113 can transmit the IoT data 190 according to a user defined method (udm), a sampling frequency stating the interval between subsequent executions of the udm, and an aggregation count stating how many executions of the udm to aggregate before sending the IoT data 190 to the management service 120. The IoT data 190 can include SI units and a prefix that identifies what the numbers of the stream of IoT data 190 represent. The instructions 166 can also include a driver to support commands or capabilities declared by the IoT device 113. The IoT management process 165 can receive the device instructions 166 and cause the IoT device 113 to carry them out.

Figure 4:
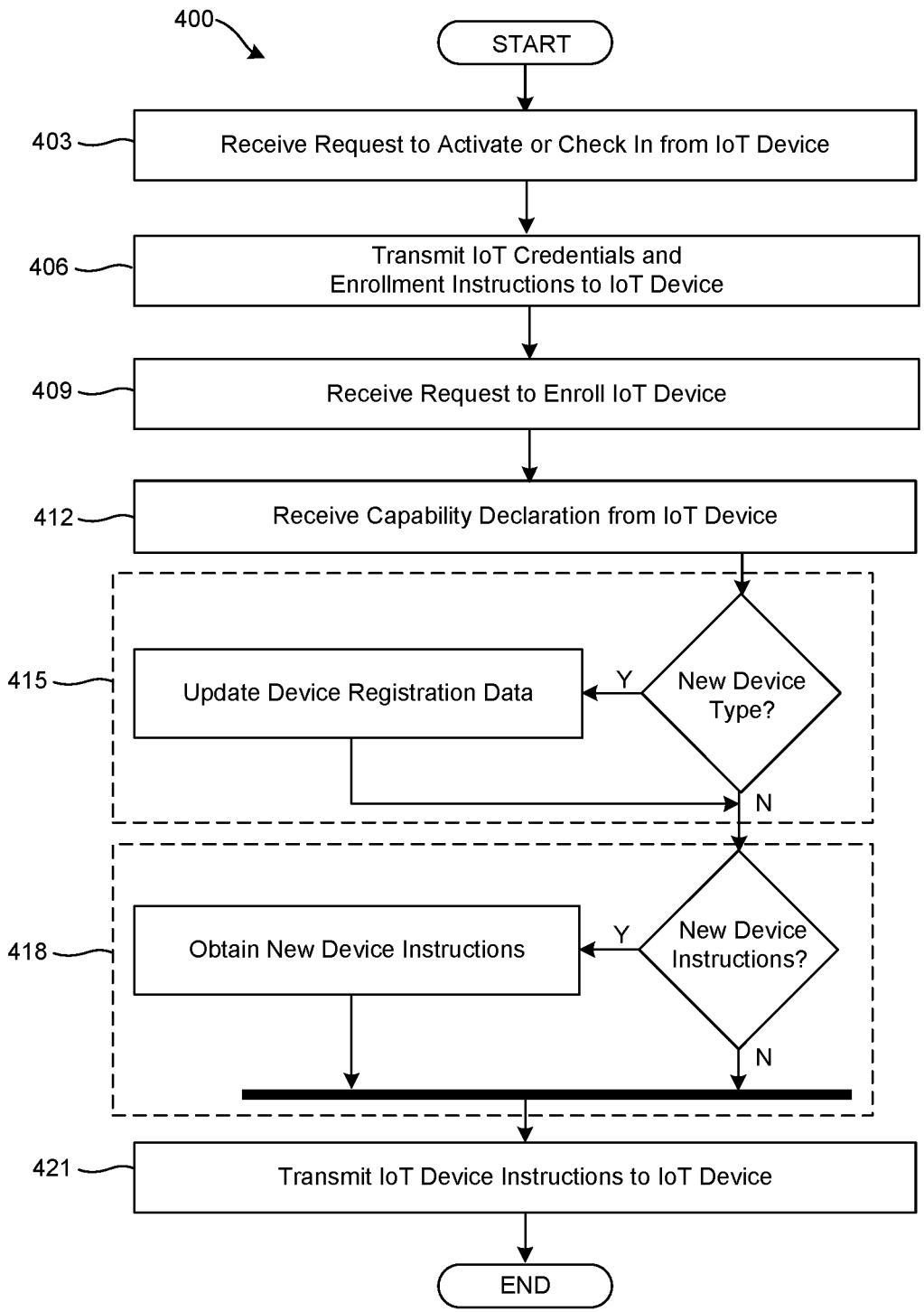

FIG. 4 shows a flowchart 400 that illustrates an example of the operation of the management service 120. Flowchart 400 illustrates an example of onboarding of the IoT device 113 with the management service 120. Generally, this flowchart enables the management service 120 to enroll the IoT device 113 with the management service 120 and transmit instructions 166 to define further actions of the IoT device 113.

In step 403, the management service 120 can receive an activation request from the IoT device 113. The activation request can include an IoT device identifier 173 that uniquely identifies the IoT device 113 with respect to other IoT devices 113. In some cases, the IoT device identifier 173 can be a manufacturer-assigned serial number or identifier.

The management service 120 can determine that the IoT device identifier 173 is associated with a device account 138. An onboarding or deployment list can specify a number of IoT devices 113 that are to be deployed by an enterprise. The IoT devices 113 can be specified according to respective IoT device identifiers 173. The deployment list can be provided to the management service 120. To this end, the management service 120 can provide an endpoint through which data including the deployment list can be received. In other cases, the management service 120 can generate a graphical user interface element or prompt through which an administrator can enter or create the deployment list. The management service 120 can generate a device account 138 for each IoT device 113 in the deployment list. A respective IoT device identifier 173 can be stored in association with a respective IoT device 113.

In step 406, the management service 120 can transmit IoT credentials 170 and enrollment instructions to the IoT device 113. The management service 120 can generate IoT credentials 170, such as a device account credential, for each device account 138. A device account credential can identify a particular device account 138 with respect to other device accounts 138. The device account credential can include a value, parameter, or a file. The IoT credentials 170 can also include one or more of an enrollment token, HMAC token, value, parameter, or a file that can be used to verify authenticity of, or otherwise authenticate, communications between the IoT device 113 and the management service 120. The enrollment instructions can identify an enrollment endpoint of the management service 120.

In step 409, the management service 120 can receive an enrollment request to the management service 120. The enrollment request can include IoT credentials 170. For example, the enrollment request can include the device account name and password. The enrollment request can also include an enrollment token. The management service 120 can receive the enrollment request at an enrollment endpoint of the management service 120 that was specified in the enrollment instructions. The management service 120 can verify that the enrollment token is valid, for example, by determining that an expiration time has not passed, and that the enrollment token is generated by the management service 120.

The management service 120 can transmit, to the IoT device 113, parameters it needs to generate a key pair and a Certificate Signing Request (CSR). The management service 120 can receive a Certificate Signing Request (CSR) from the IoT device 113. The management service 120 can receive the CSR at a SCEP endpoint of the management service 120. The management service 120 can identify a key pair in a field of the CSR. The management service 120 can validate the key paid and return a signed certificate 171 to the IoT device 113.

In step 412, the management service 120 can receive a capabilities declaration from the IoT device 113. The capabilities declaration can include device specifications 128. Device specifications 128 can include a type or category of the IoT device 113, an IoT device identifier 173, and a list of device-supported capabilities. Device specifications 128 for the IoT device 113 can also include a hardware configuration and a software configuration of the IoT device 113. The hardware configuration can specify a chipset utilized by the device, a performance or capacity, and a model identifier. The software configuration can specify applications installed on the IoT device 113, versions of installed applications, the operating system 169, and a version of the operating system 169.

In step 415, the management service 120 can determine whether the IoT device 113 is a new device type. For example, the management service 120 can perform an analysis of the capabilities declaration with respect to the IoT device registry 127. The management service 120 can determine that the IoT device 113 is unassociated with the categories currently within the IoT device registry 127. If the IoT device 113 is a new device type, the management service 120 can update the IoT device registry 127 to include a new device type that specifies the capabilities and other device specifications 128 from the capabilities declaration. If the IoT device 113 is not a new device type, the process can move to step 418.

In step 418, the management service 120 can determine whether new device instructions should be generated. For example, the management service 120 can determine that a particular device type is pre-associated with a particular set of instructions 166 a within the registry 127. Where there are predetermined instructions 166 for the device type of the IoT device 113 within the registry 127, the management service 120 can determine that new device instructions are not required, and can move to step 421.

The management service 120 can determine that new device instructions are needed if there is a lack of predetermined instructions 166 for the device type of the IoT device 113 within the registry 127. The management service 120 can then obtain new device instructions. Where new device instructions are needed, the management service 120 can generate a graphical user interface that provides a list of device capabilities for the IoT device 113 and script rules 129 for a respective capability. The script rules 129 can include rules and documentation for scripting or otherwise coding instructions 166 for each device-supported capability. This user interface can quickly provide the relevant information that allows a user or administrator to create behaviors, drivers, and other instructions 166 so they can be translated and applied by IoT management processes 165 on a variety of IoT devices 113 that include similar capabilities, even if the IoT devices 113 have different operating systems 169. The user interface can also include a user interface element that when selected allows a user to upload new instructions 166 to the management service 120.

In step 421, the management service 120 can transmit device instructions 166 to the IoT device 113. The instructions 166 can include scripts or other code that cause an IoT device 113 to perform actions, commands, or capabilities. For example, the instructions 166 can cause the IoT device 113 to transmit IoT data 190 to a particular upstream endpoint or network address. The upstream endpoint can include the management service 120 or the datacenter 106. The IoT data 190 can include a stream of at least one tuple including a number and a time stamp. The IoT device 113 can transmit the IoT data 190 according to a user defined method (udm), a sampling frequency stating the interval between subsequent executions of the udm, and an aggregation count stating how many executions of the udm to aggregate before sending the IoT data 190 to the management service 120. The IoT data 190 can include SI units and a prefix that identifies what the numbers of the stream of IoT data 190 represent. The instructions 166 can also include a driver to support commands or capabilities declared by the IoT device 113. The IoT management process 165 can receive the device instructions 166 and cause the IoT device 113 to carry them out.

Figures 5, 6:
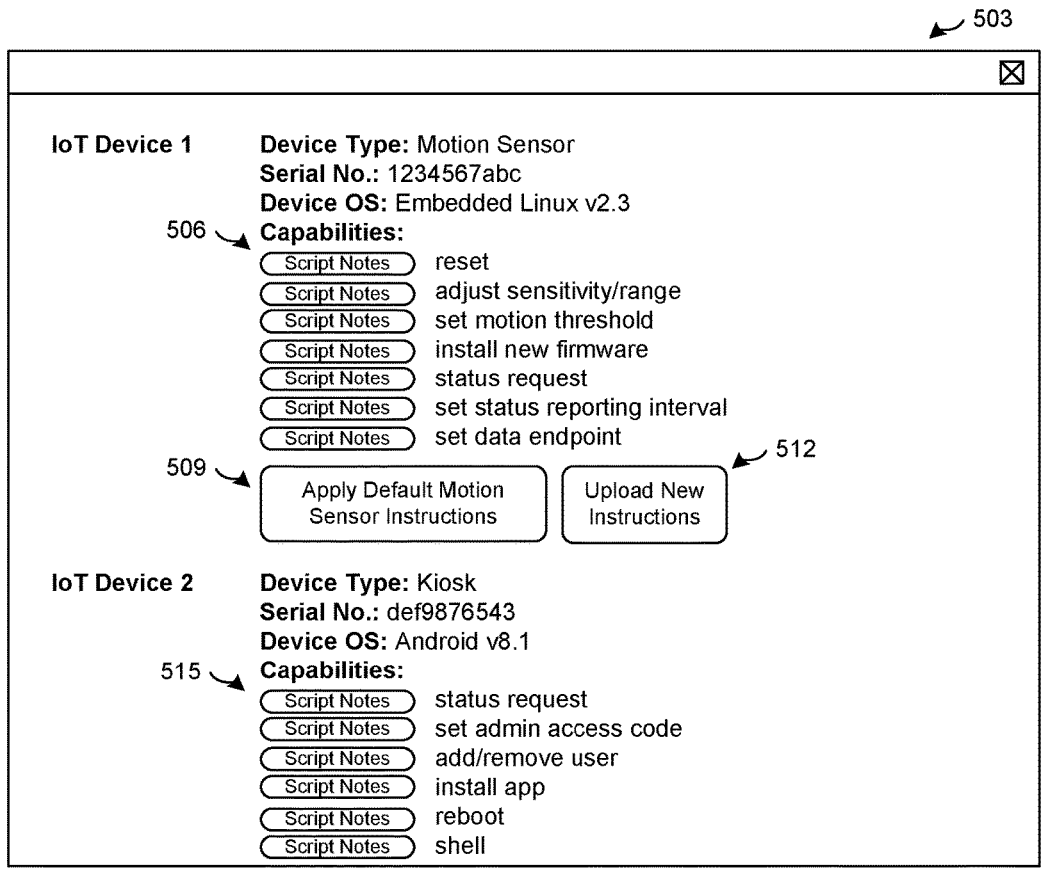
FIGS. 5 and 6 are a drawing that illustrates functionality implemented by components of the networked environment and rendered for display.

FIG. 5 is a drawing that illustrates a graphical user interface 503 generated by the management service 120 and rendered for display. The management service 120 can generate the user interface 503 for access through a display of the management system 103 or can generate the user interface 503 for access over the network 112 using a client device 109.

The user interface 503 can include device specifications 128 for a particular IoT device 113. The user interface 503 can, for example, show a device type, a serial number or IoT device identifier, a device operating system, and a list of capabilities for the particular IoT device 113, which is shown as a motion sensor.

The user interface 503 can include user interface elements 506 that, when selected, causes the user interface 503 to be updated to show script rules 129, including rules and documentation to write or generate instructions 166 for each listed capability of the motion sensor. The user interface 503 can include a user interface element 509 that when selected causes the management service 120 to apply a particular set of motion sensor instructions for the motion sensor. The user interface 503 can include a user interface element 512 that when selected allows a user to upload data or files including new instructions 166 to the management service 120. The user interface 503 can include user interface elements 515 that, when selected, causes the user interface 503 to be updated to show script rules 129, including rules and documentation to write or generate instructions 166 for each listed capability of the kiosk.

FIG. 6 is a drawing that illustrates a graphical user interface 603 generated by the management service 120 and rendered for display. The management service 120 can generate the user interface 603 for access through a display of the management system 103 or can generate the user interface 603 for access over the network 112 using a client device 109. The user interface 603 illustrates an example command line interface for the IoT Device 2 of FIG. 5. A user can enter commands through the user interface 603, and the management service 120 can transmit the commands through a shell interface or command line interface of the IoT device 2.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The IoT devices 113, gateways 111, client devices 109, and devices including the management system 103 can include a display upon which user interfaces can be rendered. The IoT devices 113, gateways 111, client devices 109, and devices including the management system 103 can also include one or more input/output devices that can include, for example, a capacitive touchscreen or other type of touch input device, fingerprint reader, or keyboard.

Although the management service 120, gateway management instructions 154, gateway management instructions 154, and other various services and functions described herein can be embodied in software or code executed by general purpose hardware as discussed above, as an alternative, the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show examples of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram and flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described herein that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described embodiments of the present disclosure are merely possible examples of implementations described for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A system, comprising:
   a computing device comprising at least one processor; and
   a data store comprising executable instructions for IoT device onboarding, wherein the instructions, when executed by the at least one processor, cause the computing device to at least:
   receive, from an Internet of Things (IoT) device, a request comprising a unique device identifier of the IoT device;
   determine, based on the unique device identifier, that the IoT device is associated with an account with a management service;
   transmit enrollment instructions to the IoT device;

receive, from the IoT device, a request to enroll the IoT device with the management service and a capabilities declaration comprising a capability of the IoT device;

determine IoT device instructions based on the capabilities declaration; and cause the IoT device to perform the capability by transmitting the IoT device instructions to the IoT device.

2. The system of claim 1, wherein the enrollment instructions comprise an enrollment token, wherein the enrollment instructions are transmitted based on the IoT device checking in with the management service.

3. The system of claim 2, wherein the enrollment token is included in the request to enroll the IoT device.

4. The system of claim 1, wherein the instructions, when executed, further cause the at least one computing device to at least:

generate a new device type based on the capabilities declaration; and update a device registry to include the new device type.

5. The system of claim 1, wherein the instructions, when executed, further cause the at least one computing device to at least:

update, within a device registry, an existing device type to include the capability.

6. The system of claim 1, wherein the instructions, when executed, further cause the at least one computing device to at least:

transmit, to the IoT device, instructions to obtain a certificate by transmitting a Certificate Signing Request (CSR) to a certificate endpoint of the management service; and wherein the capabilities declaration is authenticated based on the device account credentials and the certificate.

7. The system of claim 1, wherein the instructions, when executed, further cause the at least one computing device to at least;

generate a graphical user interface that provides, to a client device, a command line interface of the IoT device.

8. A non-transitory computer-readable medium embodying instructions for IoT device onboarding, wherein the instructions, when executed by at least one computing device, cause the at least one computing device to at least:

receive, from an Internet of Things (IoT) device, a request comprising a unique device identifier of the IoT device;

determine, based on the unique device identifier, that the IoT device is associated with an account with a management service;

transmit enrollment instructions to the IoT device;

receive, from the IoT device, a request to enroll the IoT device with the management service and a capabilities declaration comprising a capability of the IoT device;

determine IoT device instructions based on the capabilities declaration; and cause the IoT device to perform the capability by transmitting the IoT device instructions to the IoT device.

9. The non-transitory computer-readable medium of claim 8, wherein the enrollment instructions comprise an enrollment token, wherein the enrollment instructions are transmitted based on the IoT device checking in with the management service.

10. The non-transitory computer-readable medium of claim 9, wherein the enrollment token is included in the request to enroll the IoT device.

11. The non-transitory computer-readable medium of claim 8, wherein the instructions, when executed, further cause the at least one computing device to at least:

generate a new device type based on the capabilities declaration; and update a device registry to include the new device type.

12. The non-transitory computer-readable medium of claim 8, wherein the instructions, when executed, further cause the at least one computing device to at least:

update, within a device registry, an existing device type to include the capability.

13. The non-transitory computer-readable medium of claim 8, wherein the instructions, when executed, further cause the at least one computing device to at least:

transmit, to the IoT device, instructions to obtain a certificate by transmitting a Certificate Signing Request (CSR) to a certificate endpoint of the management service.

14. A computer-implemented method for IoT device onboarding, comprising:

receiving, from an Internet of Things (IoT) device, a request comprising a unique device identifier of the IoT device;

determining, based on the unique device identifier, that the IoT device is associated with an account with a management service;

transmitting enrollment instructions to the IoT device;

receiving, from the IoT device, a request to enroll the IoT device with the management service and a capabilities declaration comprising a capability of the IoT device;

determining IoT device instructions based on the capabilities declaration; and causing the IoT device to perform the capability by transmitting the IoT device instructions to the IoT device.

15. The computer-implemented method of claim 14, wherein the enrollment instructions comprise an enrollment token, wherein the enrollment instructions are transmitted based on the IoT device checking in with the management service.

16. The computer-implemented method of claim 15, wherein the enrollment token is included in the request to enroll the IoT device.

17. The computer-implemented method of claim 14, further comprising:

generating a new device type based on the capabilities declaration; and updating a device registry to include the new device type.

18. The computer-implemented method of claim 14, further comprising:

updating, within a device registry, an existing device type to include the capability.

19. The computer-implemented method of claim 14, further comprising:

transmitting, to the IoT device, instructions to obtain a certificate by transmitting a Certificate Signing Request (CSR) to a certificate endpoint of the management service.

20. The computer-implemented method of claim 14, further comprising:

generating a graphical user interface that provides, to a client device, a command line interface of the IoT device.

* * * * *